United States Patent
Xu et al.

(10) Patent No.: US 6,493,694 B1
(45) Date of Patent: Dec. 10, 2002

(54) METHOD AND SYSTEM FOR CORRECTING CUSTOMER SERVICE ORDERS

(75) Inventors: Jiyang Xu, Superior, CO (US); Rodolphe Jean Nassif, Louisville, CO (US); Joan Marie Swinney, Avada, CO (US); Connie Dell Winston, Aurora, CO (US)

(73) Assignee: Qwest Communications Interational Inc., Denver, CO (US)

( * ) Notice: Subject to any disclaimer, the term of this patent is extended or adjusted under 35 U.S.C. 154(b) by 0 days.

(21) Appl. No.: 09/283,432

(22) Filed: Apr. 1, 1999

(51) Int. Cl.[7] .................... G06F 17/00; G06F 17/60; H04M 1/24; H04M 3/08
(52) U.S. Cl. ................... 706/47; 379/9.03; 379/9.04
(58) Field of Search .............. 706/47, 11; 379/9.02, 379/9.03, 9.04; 705/8; 707/500, 530

(56) References Cited

U.S. PATENT DOCUMENTS

| | | | |
|---|---|---|---|
| 4,754,409 A | * 6/1988 | Ashford et al. | 706/10 |
| 5,200,893 A | * 4/1993 | Ozawa et al. | 707/531 |
| 5,371,807 A | * 12/1994 | Register et al. | 382/159 |
| 5,414,752 A | * 5/1995 | Jonsson | 379/93.12 |
| 5,432,948 A | * 7/1995 | Davis et al. | 704/2 |
| 5,442,690 A | * 8/1995 | Nazif et al. | 379/201.03 |
| 5,446,653 A | * 8/1995 | Miller et al. | 705/4 |
| 5,640,587 A | * 6/1997 | Davis et al. | 707/535 |
| 5,687,212 A | * 11/1997 | Kinser, Jr. et al. | 379/9.03 |
| 5,754,737 A | * 5/1998 | Gipson | 706/11 |
| 5,790,633 A | * 8/1998 | Kinser, Jr. et al. | 379/9.02 |
| 5,790,634 A | * 8/1998 | Kinser, Jr. et al. | 379/29.01 |
| 5,881,131 A | * 3/1999 | Farris et al. | 370/259 |
| 5,920,846 A | * 7/1999 | Storch et al. | 705/7 |
| 5,953,389 A | * 9/1999 | Pruett et al. | 379/9 |
| 6,006,242 A | * 12/1999 | Poole et al. | 707/531 |
| 6,295,542 B1 | * 9/2001 | Corbin | 707/501.1 |

OTHER PUBLICATIONS

Hung et al., "An Intelligent Assistant for the Management of Telecommunications Network Services", Proceedings of the International conference on Expert Systems for Development, Mar. 1994, pp. 234–237.*

Pazzani et al., "Detecting and Correcting Errors in Rule–Based Expert Systems: An Integration of Empirical and Explanation–Based Learning", NEC Research Index, Knowledge Acquisition, Jun. 1991, pp. 157–173.*

* cited by examiner

*Primary Examiner*—Thomas Black
*Assistant Examiner*—Kelvin Booker
(74) *Attorney, Agent, or Firm*—Brooks & Kushman P.

(57) ABSTRACT

A method and system for correcting a text service order from a customer is provided. The method includes converting the service order into a linked data structure, and applying a plurality of rules to the linked data structure. The linked data structure is modified, as demanded, based on the plurality of rules. The method further includes converting the linked data structure into a corrected service order when the linked data structure has been modified based on the plurality of rules.

28 Claims, 4 Drawing Sheets

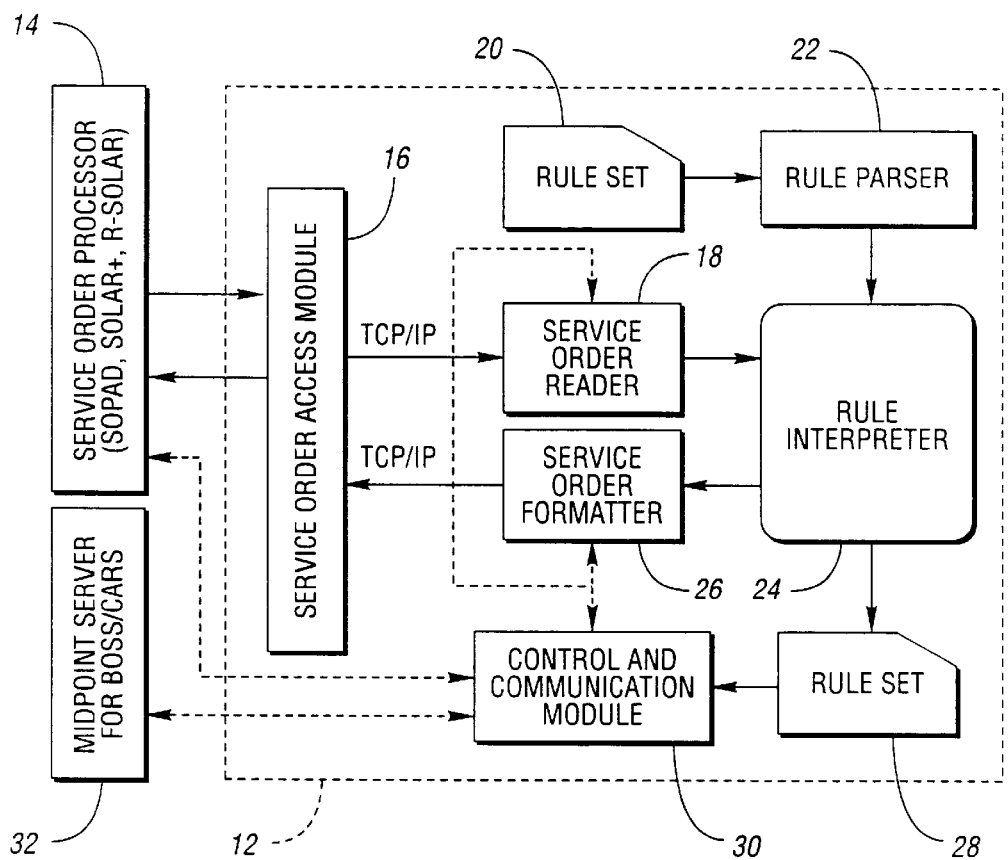

Fig. 1

```
00SHDR  02CSTCD PD02CDTINDAD01COWNIDB02CDPCD  04CBPC    00SID  16C
TN 303 684-0220   01CSAI  03CCUS  63904CEXCH LGM 08CCD       0
5CAPPDT01-1712CAPPTM11A       05CDD  01-2101CDDACC    01CDDAPCX03CMA
      01CORDT C08CORDN 2602450001CASFX  08CSFX       05CCS  1FB 07C
SLS HB1CR2M00SIDEX 12CRTG  (VM 303-651)01CPCS  Y00SLIST 24CLN   MIDWE
ST; FOREST PRODUCTS22CLA   2013 LINCOLN, LONGMONT00SBILL 22CBN1  MIDWE
ST FOREST PRODCTS12CBA1   2013 LINCOLN17CPO    80501 LONGMONT CO02CTAR
CG07CMCN AAXBSOS00SS&E 03AR1  1FB04FPICX 028800FNMC 03AR   9LM05A
I  R5CEM03AR   MWW08FTN 684-022003AR  ESM03AR   NNK03AR   EVF
08FCFN 776-260001FRCYC 303AR   MBB06FVMO COS-1308FTN  684-022003AR
      VFN03AI1   VBS05AR1  RGG1A08FTN  684-669400SRMKS 08CACC C:05:00
P23CRMK  CBR P3036840220 OPB DAVE
```

```
000000-0001 PD-AD XX XX 0221-0939
303 684-0220    639         LGM  01-17 11A
C26024500    1FB   HB1CR2M 01-21  X

---IDEX
RTG  (VM 303-651)
PCS  Y

---LIST
LN   MIDWEST; FOREST PRODUCTS
LA   2013 LINCOLN, LONGMONT

---BILL
BN1  MIDWEST FOREST PRODCTS
BA1  2013 LINCOLN
PO   80501 LONGMONT CO
TAR  CG
MCN  AAXBSOS

---S&E
R1   1FB   /PICX 0288/NMC
R    9LM
I    R5CEM
R    MWW   /TN 684-0220
R    ESM
R    NNK
R    EVF   /CFN 776-2600/RCYC 3
R    MBB   /VMO COS-13/TN 684-0220
R    VFN
I1   VBS
R1   RGG1A /TN 684-6694

---RMKS
ACC  C:05:00P
RMK  CBR 3036840220 OPB DAVE
```

*Fig. 2*

```
HDR                              BILL
    C  STCD  PD                      C  BN1  MIDWEST FOREST PRODCTS
    C  DTIND AD                      C  BA1  2013 LINCOLN
    C  OWNID B                       C  PO   80501 LONGMONT CO
    C  DPCD                          C  TAR  CG
    C  BPC                           C  MCN  AAXBSOS
ID                               S&E
    C  TN    303 684-0220          A R 1FB  1
    C  SAI                              F  PICX  0288
    C  CUS   639                        F  NMC
    C  EXCH  LGM                   A R 9LM
    C  CD                          A I R5CEM
    C  APPDT 01-17                 A R MWW
    C  APPTM 11A                        F  TN    684-0220
    C  DD    01-21                 A R ESM
    C  DDACC                       A R NNK
    C  DDAPC X                     A R EVF
    C  MA                               F  CFN   776-2600
    C  ORDT  C                          F  RCYC  3
    C  ORDN  26024500              A R MBB
    C  ASFX                             F  VMO   COS-13
    C  SFX                              F  TN    684-0220
    C  CS    1FB                   A R VFN
    C  SLS   HB1CR2M               A I VBS  1
IDEX                             A R RGG1A 1
    C  RTG   (VM 303-651)               F  TN    684-6694
    C  PCS   Y                   RMKS
LIST                                C  ACC  C:05:00P
    C  LN    MIDWEST; FOREST PRODUCTS  C  RMK  CBR 3036840220 OPB DAVE
    C  LA    2013 LINCOLN, LONGMONT
```

```
401027:         /* check for S&E.VFN.DES */
    for fid like CurrentOrder.S&E."[ITER]VFN"
       if ( CurrentOrder.ID.ORDT == "N"
           or CurrentOrder.ID.ORDT == "T"
           or CurrentOrder.ID.ORDT == "C"
       )
       and not exist fid.DES
       and not exist fid.MBOA
     then fid.DES = "MBOA P4"
     else (
          if exist fid.DES
              and not fid.DES like ".*MBOA.*"
          then fid.DES = concat(fid.DES, ",", "MBOA P4")
       );
```

```
000000-0001 PD-AD XX XX 0221-0939
303 684-0220    639         LGM 01-17 11A
C26024500    1FB   HB1CR2M 01-21  X

---IDEX
RTG  (VM 303-651)
PCS  Y

---LIST
LN   MIDWEST; FOREST PRODUCTS
LA   2013 LINCOLN, LONGMONT

---BILL
BN1  MIDWEST FOREST PRODCTS
BA1  2013 LINCOLN
PO   80501 LONGMONT CO
TAR  CG
MCN  AAXBSOS

---S&E
R1   1FB   /PICX 0288/NMC
R    9LM
I    R5CEM
R    MWW   /TN 684-0220
R    ESM
R    NNK
R    EVF   /CFN 776-2600/RCYC 3
R    MBB   /VMO COS-13/TN 684-0220
R    VFN
I1   VBS
R1   RGG1A /TN 684-6694

---RMKS
ACC  C:05:00P
RMK  CBR 3036840220 OPB DAVE
```

40

*Fig. 6* mentioned# METHOD AND SYSTEM FOR CORRECTING CUSTOMER SERVICE ORDERS

TECHNICAL FIELD

The present invention relates to methods and systems for correcting a text service order from a customer.

BACKGROUND ARTS

For telephone companies, service requests from customers such as installation of new lines and change of services are stored as service orders. Service orders are typically created by service representatives who directly interact with customers. They are analyzed by a software system known as service order processor (SOP) and distributed to various down stream systems for execution. Due to the complexity of service orders (especially for business lines), it is very common to make logical and typing errors when they are typed in, and these errors may delay or block the automatic distribution and processing of the service orders and may cause wrong types of actions to be performed. To avoid these service problems, the companies often dedicate many staff members to correct erroneous orders manually Although existing techniques to correct erroneous service orders have been used in many applications, many employees and work hours must be dedicated to correcting the erroneous service orders. Further, unfortunately, some erroneous service orders may go by unnoticed, or may be improperly corrected so that the service order still has errors.

For the foregoing reasons, there is a need for a method and system for correcting customer service orders that overcomes the problems and limitations with the prior art.

DISCLOSURE OF INVENTION

It is, therefore, an object of the present invention to provide a method and system for correcting text service orders that utilizes rule-based techniques.

In carrying out the above object, a method for correcting a text service order from a customer, with the service order having a plurality of text fields, is provided. The method comprises converting the service order into a linked data structure, applying a plurality of rules, and converting the linked data structure into a corrected service order. The linked data structure represents the plurality of text fields. The plurality of rules are applied to the linked data structure to modify the linked data structure as demanded, based on the plurality of rules. The linked data structure is then converted into a corrected service order when the linked data structure has been modified based on the plurality of rules.

In a preferred embodiment, applying the plurality of rules comprises establishing a rule set, parsing the plurality of rules into an internal form, and applying the plurality of rules in the internal form with a rule interpreter to modify the linked data structure as demanded based on the plurality of rules. Further, preferably, converting the service order further comprises fetching the service order from a service order processor, and parsing the service order into the linked data structure. Still further, preferably, converting the linked data structure further comprises formatting the linked data structure to form the corrected service order, and updating a service order processor with the corrected service order when the linked data structure has been modified based on the plurality of rules. It is preferred that service order modifications are recorded in a log.

In a preferred embodiment, the method further comprises receiving a correction request at a control module, and instructing a service order reader to convert the service order upon receiving the correction request. Further, preferably, the service order has a plurality of sections with each section having a plurality of fields. Each field has a type selected from the group consisting of: left hand, universal service offering code, and floated. Further, preferably, the linked data structure is a tree-like data structure having a root representing the service order, having a plurality of first-level children with each first level child representing a section of the plurality of sections, and having a plurality of second-level children with each second-level child representing a field of the plurality of fields. Still further, the service order is preferably represented as free-flow data lines.

Preferably, rules include a label, and a rule body including an optional loop specification part, a condition part, an action part and an optional else action part. In a suitable implementation, the method is performed at least partially on a UNIX-based platform.

Further, in carrying out the present invention, a system for correcting a text service order from a customer is provided. The system comprises a service order reader, a rule interpreter, and a service order formatter. The service order reader is configured to convert the service order into a linked data structure representing the plurality of text fields. The rule interpreter is configured to apply a plurality of rules to the linked data structure to modify the linked data structure as demanded based on the plurality of rules. The service order formatter is configured to convert the linked data structure into a corrected service order when the linked data structure has been modified based on the plurality of rules.

A preferred embodiment of the system further comprises a rule set including the plurality of rules, and a rule parser configured to parse the plurality of rules into an internal form. Further, preferably, the service order reader is further configured to fetch the service order and subsequently parse the service order. Further, the service order formatter is preferably configured to format the linked data structure to form the corrected service order, and to update the service order processor with the corrected service order when the linked data structure has been modified based on the plurality of rules.

Preferably, a control module is configured to, upon receiving a correction request, instruct the service order reader to convert the service order by fetching and parsing the service order.

In a preferred embodiment, the service order reader, the rule interpreter, and the service order formatter are implemented at least partially in software on a UNIX-based platform. Further, preferably, a service order access module is configured to bridge communication between the service order reader and a service order processor, and to bridge communication between the service order formatter and the service order processor. Further, preferably, the service order reader, the rule interpreter, and the service order formatter are implemented as software in a single executable file. Preferably, the single executable file is programmed to support a plurality of different processing modes that are selectable with command line options. Further, the service order reader, the rule interpreter, and the service order formatter are further configured to issue service orders.

The advantages associated with embodiments of the present invention are numerous. For example, embodiments of the present invention utilize a rule language for rule-based automatic service order correction/creation. The rule language is designed to enable straightforward translation of error conditions and corresponding corrective actions into formal rule statements of the language. Furthermore, the rules are preferably interpreted at run-time, providing additional flexibility and ease of modification.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram illustrating the system architecture of a preferred embodiment of the present invention;

FIG. 2 is a sample service order that is fetched by the service order reader (FIG. 1);

FIG. 3 is a free-flow representation of the sample service order shown in FIG. 2;

FIG. 4 is the internal representation of the service order of FIG. 2, after parsing by the service order reader (FIG. 1);

FIG. 5 is a sample rule for use in embodiments of the present invention; and

FIG. 6 is the service order of FIG. 2, after modification in accordance with the rules shown in FIG. 5.

BEST MODE FOR CARRYING OUT THE INVENTION

Referring now to FIG. 1, a system of the present invention is generally indicated at 10. Preferably, the control logic for embodiments of the present invention is implemented in software in a UNIX-based platform. However, combinations of hardware and/or software may be employed in embodiments of the present invention as is appreciated by one of ordinary skill in the art. Control Logic 12 contains the hardware and/or software that is configured to implement systems and methods of the present invention. In a preferred embodiment, the inventors call Control Logic 12 the "Magic Box". It is to be appreciated that the description set forth below of the Magic Box implementation describes a preferred embodiment of the present invention, and that many suitable alternative variations exist for implementing automatic rule-based error correction in connection with the present invention.

Generally, Controlled Logic 12, which is at least partially implemented on a UNIX platform, communicates with mainframe systems including, for example, a service order processor 14, through a service order access module 16. Service order reader 18 fetches a service order and parses the service order. Rule set 20 is parsed by rule parser 22. Rule interpreter 24 applies the parsed rules to the parsed service order to perform corrections as will be described later herein. Thereafter, service order formatter 26 formats the corrected service order and communicates through service order access module 16 to replace the service order on service order processor 14 with the corrected one, when modifications to the service order have been made. Preferably, modifications are recorded into log 28. Further, control and communications module 30 controls operations as indicated by the dashed control lines and as will be further described. In appropriate configurations, control and communication module 30 may be configured to communicate with Legacy Systems and other systems such as, for example, Multipoint Server 32.

With reference to FIGS. 1 through 6, and primarily to the system architecture shown in FIG. 1, the preferred embodiment of the present invention, called Magic Box by the inventors, is configured to automatically correct (and optionally create) service orders. Further, a suitable rule language is described herein. It is to be appreciated that in different applications it may be desirable to make modifications to the rule language and/or additions to the rule language to perform systems and methods of the present invention as is appreciated by one of ordinary skill in the art.

Introduction

Magic Box, a preferred implementation of the present invention, is an on-line system developed to correct automatically many categories of service order errors. The system turned out to be very successful in testing, correcting around 70% to 80% of all errors in the areas where Magic Box has been tested (there are ongoing efforts to extend Magic Box to cover more categories of errors). Due to the fact that different categories of errors may be detected by different legacy systems and changes to the components of service orders are very often, flexibility and maintainability are important aspects of the present invention. Among other things, a dedicated language has been developed to provide an easy way of specifying error conditions and correcting actions. The language can be classified as declarative and rule-based, where each rule describes possibly a certain type of error conditions and actions to fix them. The rule language allows easy references to parts of service orders and employs a rich pattern matching mechanism for specifying error conditions as well as for selection of fields in the service orders.

Magic Box System

Magic Box System Architecture

The major components of Magic Box 12 are illustrated in FIG. 1. The bold, dashed arrows indicate major control paths and thin, solid arrows indicate main data paths. The rule parser 22 reads in rules 20 written in the rule language from a file and parses them into an internal form for the rule interpreter 24 to use. The rule interpreter 24 is the core of Magic Box and it applies rules to service orders and makes corrections when it is necessary. The service order reader 18 fetches and parses service orders from the SOP 14 through a server module 16 running on the mainframes (where the legacy systems are), and the service order formatter 26 performs the reverse role—it formats service orders and updates them in the SOP 14 also through the server module 16 on the mainframes. The log 28 records changes made to the service orders by Magic Box as well as warning messages and is used to generate reports and inputs to other automated systems. Finally, the control and communication module 30 receives correction requests from various sources, instructs the service order reader 18 to fetch the orders, starts the rule interpreter 24 to process the orders, instructs the service order formatter 26 to update the orders if so requested, and reports the processing results to appropriate systems and staff members. The control module is also responsible for triggering other automation software that take the information generated by Magic Box 12 as inputs.

Structure of Service Orders

A service order consists of a header and several sections, typically including an ID section, a LIST section, a BILL section, an S&E section, and a RMKS (remark) section. Each section contains many fields, called fids, each of which has a name, a data value, and optionally an action code. There are three types of fids: left hand (so named as they appear on the far left column on a SOPAD screen), USOC (Universal Service Offering Codes), and floated fids. USOC fids are always associated with an action code, which can be "I" (inward, i.e., new service), "C" (change from), "T" (change to), "R" (recapped), "E" (enter the record), "D"

(delete from the record) "O" (outward, i.e., disconnect the service). Floated fids are always affiliated to left hand or USOC fids and are used to carry additional and/or optional information. Logically, floated fids can be considered parts of their main (left hand or USOC) fid.

FIG. 2 shows a service order image 32 as seen from a SOPAD screen. Except for the header, which includes the first two lines, and the ID section, which includes the third and fourth lines, sections are started by a heading (e.g.—LIST) followed by a left-hand and USOC fids. Floated fids are shown after the data of their main fid, separated by a "/". The name of left hand fids are always at the left-most column (e.g. BN1), while action code of a USOC fids is on the first column and its name follows (e.g. R MWW). The header and ID section have a fixed format 50 that fids are identified by their locations on the screen.

The service orders are passed between different systems in a free-flow string format and it is in this format that Magic Box receives and sends service orders. Internally, Magic Box uses a tree-like data structure to store a service order. The root of the tree represents the entire service order, each of the first-level children represents a section (header is treated as a section), child nodes of sections represent main fids, and floated fids are represented as children of their main fids. As mentioned, the service order reader and formatter are responsible for converting service orders between the free-flow string format and the internal tree representation of Magic Box.

The example shown in FIG. 3 is the free-flow representation 34 of the service order 32 in FIG. 2. In this example, the first data line is "OOSHDR", namely, a section header (as is indicated by the type "S"), with a name "HDR" (for the header section) and without any data (as the data length is "OO"). The second data line, "02CSTCD PD", represents a left-hand fid (as is indicated by type "C") with the name "STCD" and the data "PD". Similarly, the next data line, "02CDTINDAD", is interpreted as a left-hand fid with the name "DTIND" and the data "AD".

The type field of data line can be "S" for section header, "C" for left hand fid, "A" for USOC fid, "F" for floated fid, a blank character for continuation of previous line, and "N" for indented data found in the LIST section.

Large service orders are often broken into several segments when passed between systems. In this case some header information is added to each segment in order to identify the size of the segment and whether there are more segments to follow. The header information the Magic Box receives has 11 bytes prefixed to each segment and takes the following format:

SSSfnnnnmmm

In the above, f is either a blank character, indicating there are more segments to follow, or "L", indicating this is the last segment. nnnn is a decimal number indicating the number of bytes (characters) contained in the segment (excluding the segment header itself) plus 3 (for mmm, and mmm is the number of data lines contained in the segment.

As is seen above, the analysis of free-flow data lines is straightforward. There is one slight complication for data lines representing USOC fids. For a USOC fid, the name field and the data field in a data line are interchanged. In addition, the first bytes in the name field is an action code. For example, the data line "03AR MWW" represents a USOD fid, as is indicated by the type character "A". This data line should be interpreted as having a name of "MWW", an all blank data field, with an action code of "R".

The Service Order Reader (18. FIG. 1)

The task of this component is to parse service orders and create their internal representation. In the existing service order processing environment, service orders are passed among systems in a format that has been referred to as free-flow data lines. A service order is represented as multiple data lines, with each data line having a length field, a type field, a name field, and a data field. All the fields are of fixed size except the data field, which is a variable length field, with the size defined by the length field. More specifically, a data line consists of a length field of 2 bytes long, a type field of 1 byte long, a name field of 5 bytes long, and a data field whose length is given by the length field.

Each data line normally represents a fid in the service order. A section header is also represented as a data line. The header is treated as a section in free-flow data format. It is easy to see that a sequential scan is sufficient to parse the service orders represented as free-flow data lines. That is essentially the strategy a reader uses to convert service orders into their internal representation as a three-level linked list, with sections at outmost level, main fids (non-floated) at second level, and floated fids at the innermost level.

As an example, for the service order in the free-flow data lines format, as previously described, the reader would generate the linked list shown in FIG. 4 as its internal representation. Recently, the service order reader 18 has been enhanced to accept several other formats in addition to the free-flow format mentioned here. Table 1 lists formats that are currently supported by the reader/formatter in a suitable implementation.

TABLE 1

Service Order Formats Recognized by Magic Box

| Format Name | Input (reader) | Output (formatter) | Description |
|---|---|---|---|
| string_sopad | yes | yes | Free-flow format as shown in FIG. 3 |
| string_solar | yes | yes | Same free-flow format except line width is limited to 30 instead of 99 |
| image_sopad | yes | yes | SOPAD dump format |
| image_solar | yes | yes | SOLAR + dump format |
| image2_sopad | yes | yes | SOPAD MQ distribution format |
| list_rsolar | yes | no | R-SOLAR dump format |
| list_show | no | yes | For displaying purpose only |

The Service Order Formatter (26, FIG. 1)

Service orders modified by the Rule Interpreter 24 need to be sent back to SOPAD 14 for distribution. (Note that orders not updated were not sent to SOPAD.) The Formatter 26 is responsible for converting the orders from their internal representation back to the free-flow data lines format. In other words, the Formatter 26 does exactly the reverse processing of the service order reader 18.

The processing of the Formatter 26 involves traversing through the linked list representing a server order, and generating free-flow line for each section or fid. One additional detail that the Formatter 26 needs to take care of is that large service orders need to be broken up into smaller segments, in the format described earlier in this action.

Recently, the service order formatter 26 has been enhanced to output in several other format in addition to the free-flow data format. Table 1 lists all formats that are currently supported by the reader/formatter, and is illustrated above.

The Rule Parser (22. FIG. 1)

The rule parser 22 is essentially a language processor for the rule language. It reads the rules from a text file during system initialization, breaks the rules up into lexical tokens, parses them and builds a parse tree as an internal representation for the rules.

The rule file is a text file containing one or more rules. Each rule consists of a label and a rule body. A rule body, also called a procedure, typically consists of an optional loop specification part, a condition part, an action part, and an optional "else" action part, as illustrated by the example in FIG. 5. It is important to note that a rule must be terminated using a semicolon (";") (in the preferred version of the Magic Box embodiment).

As can be seen in this example, the parts of a rule are very easy to identify. In the example, the label is "401027", the loop specification part is the line started with the key word "for", the big compound condition between the keywords "if" and "then" forms the condition part, the imperative statement after "then" makes up the action part, and the compound structure after "else" is the "else"-action part, which contains a nested rule. Also shown in this example is the comment construct. Anything delimited by "/*" and "*/" is considered a comment and is ignored by the language processor.

The conditional expression is fairly straightforward and self-explanatory. Logical conjunctives "and", "or" and "not" are used to form complex conditions, with a left associativity and the "and" given a higher grouping precedence, a commonly-seen practice. Parentheses can be used to override this default associativity and precedence convention.

The example uses three primitive logic test operators, "==", "like", and "exist". The equality operator "==" tests for equality of two string values. The match operator "like" provides a pattern matching facility to compare a string value with a string pattern. For example, the pattern ".*MBOA.*" would match any string containing the sequence "MBOA". An extended regular expression is used as the pattern description language. Finally, the unary operator "exist" tests for the existence of a field in a service order, which produces a "TRUE" value if the field exists; otherwise, it produces a "FALSE" value.

The Rule Interpreter (24, FIG. 1)

The Rule Interpreter 24 executes rules against service orders, making necessary modifications on them as required. The preferred execution model is: the rules are evaluated one at a time, in the order they are defined. For each rule, its condition part is first evaluated, followed by carrying out its action part if the condition turns out to be true, or carrying out its "else"-action part (doing nothing if the part does not exist) if the condition part evaluates to false. When the loop part is present, the procedure is repeated for every fid satisfying the loop specification.

As an example herein, the rule in FIG. 5 is applied on the service order in FIG. 2. There is only one fid satisfying the loop specification, "RVFN". The interpreter 24 evaluates the condition part for the fid, and turns out to be true, and hence the action part is executed, which adds a new floated fid ("DES") to the main fid, with the value "MBOA P4". Notice that the action in the rule simply says "set the value of the floated fid "DES" of the main fid ("RVFN") in the S&E section to 'MBOA P4'". Since the floated fid did not exist in the original order, a new floated fid was created with the given value. The modified service order should look like the one shown in FIG. 6.

Magic Box Engine Interfaces

Service Order Access Module (16, FIG. 1)

The Service Order Access Module (SOAM) 16 is responsible for bridging communication between the Magic Box and the SOP systems. SOAM and the engines suitably communicate through TCP/IP socket connections. The SOAM is running as a server waiting for confections and requests from engines, which are viewed as clients in this case.

The commands are issued implicitly by the Magic Box engine and can also be issued by the users through the interactive mode of the engine. Commands supported by the SOAM are listed below for a suitable implementation. Because the users never deal with the raw command directly, the command syntax of the engine in its interactive mode (how to invoke the engine in this mode is described in this section) is listed in Table 2.

TABLE 2

Commands of Service Order Access Module

| Command | Parameters | Description |
| --- | --- | --- |
| IQ | (ordn) | Retrieve a service order for inquiry. No update is allowed to the service order. The service order is returned. |
| UP | (ordn) | Retrieve a service order for inquiry. The service order will be locked so that others cannot modify it. The service order is returned. |
| RP | (ordn).(order) | Replace a service order retrieved using UP command by (order) and unlock the order. |
| UN | (ordn) | Unlock the service order retrieved through UP command without replacing it with a modified copy. |
| EN | (ordn).(order) | Create a new service order with the given order number and data (order). |
| CO | (ordn) | Cancel an existing service order, which must have been retrieved through UP command. |
| PS | (tn) | Checking for pending orders on the account. A list of pending orders will be returned. This command is supported only on SOPAD. |
| QT | | Shut down the SOAM. |
| CL | | Close the connection of the current client (engine). |

Magic Box Engine Executable

The Magic Box engine is preferably implemented as a single executable named "soc", which have many modes and options. The general syntax looks like:

soc (options (input-spec)

A typical usage looks like:

soc -m (mode) -r (ruleset) (other-options) (input-spec)

The Magic Box Engine supports mainly 7 different processing modes, which will be discussed later in this section. Additionally, orthogonal to the processing modes, the engine can operate in either local operation mode, in which case service orders are loaded/stored locally from/to files, or remote operation mode, in which case service orders are fetched/saved from/to SOP machines. Local operation mode is meant primarily for testing or preprocessing purposes. Whether the Magic Box Engine is operating in remote operation mode is determined by the presence of the command line option "-H" which is used to specify the IP address of the machine where the Service Order Access Module is located. Table 3 lists a suitable set of command line options.

TABLE 3

Command Line Options of Magic Box Engine

| Option | Argument | Description |
| --- | --- | --- |
| -m | (mode) | Specify a processing mode. Default is "s" |
| -r | (rule) | File name for the rule set. There is no default. |
| -l | (log) | Log file name. Default is the standard output. |

TABLE 3-continued

Command Line Options of Magic Box Engine

| Option | Argument | Description |
|---|---|---|
| -d | (date) | Pretended the run date. Default is today's date. Certain rules are sensitive to the date when the rules are applied. This option is used for testing only. |
| -b | (dir) | Directory of data files. Default is current one. |
| -c | (dir) | Directory of rule and other auxiliary code files. Default is the current directory. |
| -t | (sec) | Timeout in seconds for communication to SOAM and the BOSS/CARS systems. Default 120. |
| -s | (region) | SOP system: "CENTRAL" for the central region, "EASTERN" for the eastern, and "WESTERN" for the western region. Default is "CENTRAL". |
| -i | (csrmode) | Specifies how to access midpoint server for retrieving CSR, posting notes, and retrieving Date of Installation. Possible modes are "YP", "N", "A" or "C". The default value is "A". |
| -f | (fmt) | Service order format. See Table 1 for possible values. |
| -H | (hostname) | IP address for the SOAM. Without the option is local mode. |
| -P | (port) | Port number for the SOAM. For remote mode only. |
| -S | | Save retrieved order/CSR/DOI in remote mode. |
| -U | | Always on in interactive processing mode. For remote mode: update the service order in SOP when necessary. Without the option the order will be retrieved for inquiry only. Note applicable in the interactive mode. For local mode, it instructs saving the updated order in a file with ".uo" extension. |
| -T | (tn) | For R remote mode: save order locally as well. |
| -O | (outpipe) | The telephone number (s mode only) |
| -D | (name) = (value) | Output pipe name (p mode only, default stdout) |
| -D | | define variables that can be used in rules |
| -q | (name) | define variables that can be used in rules |
| -k | (n) | R mode only, quit after n consecutive CSR fetch failure for R and f mode only: skip entries until after the given (tn) (in R mode) or (ordn) (in f mode). |
| | (tn) or (ordn) | |

For the "-i" option, it specifies how to access midpoint server for retrieving CSR, posting notes, and retrieving data of installation. With mode "Y", the request is sent to the BOSS/CARS system through the midpoint server. If "-S" option is present, the retrieved information will be saved locally in files. With mode "N", the information is loaded from locally saved files-this is primarily for testing purpose. With mode "A", which is the default, the engine sends the request to the midpoint server if the operation mode is remote, and loads from local files if the operation mode is local. The last mode, "C", is the same as "Y" except it maintains a single connection to the midpoint server throughout the session instead of connecting on the fly. This can therefore lead to much better performance and hence is recommended if midpoint server is frequently accessed (e.g. service order creation modes).

Engine Modes

The Magic Box Engine supports mainly 7 different processing modes in a suitable implementation, as listed in Table 4. Among them, 4 modes are for service order error correction, 2 modes are for service order issuance, and the remaining one is for direct communication with the Service Order Access Module (SOAM, see Introduction section) for simple tasks such as fetching, replacing and cancel service orders. The interactive mode only makes sense when used with the remote operation mode. Below we explain each of the processing mode in detail, and also illustrate Table 4.

TABLE 4

Processing Modes of Magic Box Engine

| Processing Mode | Description |
|---|---|
| s | check/correct single service order |
| f | check/correct service orders listed in a file |
| p | check/correct service orders fed in through a pipe |
| k | check/correct service orders fed in through a socket |
| S | originate a single service order |
| R | originate service orders listed in a file |
| i | interactive command mode |

"s"—Single Order Processing Mode

In this mode, the engine is invoked to process one service order only. The service number is passed in as the argument (input-spec). For the remote mode, the service order will be fetched from the SOP system through SOAM. This mode is the default mode for the engine. A typical call in local mode looks like:

soc -r bvms.mbr C12340002

The service order should be stored in a file whose name is composed by appending the suffix ".so" to the order number. In the above example, for instance, the service order should be in the file "C12340002. so". A typical call in remote mode looks like:

soc -r bvms.mbr -H tso07-P 5026 C12340002

"f"—Multiple Orders Mode from a File

In this mode, the engine is invoked to process multiple service orders listed in a file, whose name is passed in as the argument (input-spec). Each line of the file should contain a service order number and optionally followed by a 10 digit telephone number (no dash or space in between) separated by a space. The engine processes all service orders listed in the file. A typical call looks like:

soc -m f -r bvms.mbr orderspec soc -m f -r bvms.mbr -H tso07 -P 5026 orderspec where the file "orderspec" may look like:

C12340001  3035416401  C12340002  3035416409
N12340022  3035416412

"p"—Multiple Orders Mode from a Pipe

This mode is also used to process multiple service orders, but instead of taking order numbers from a file, it receives order numbers through a named pipe. Each request received from the pipe must have exactly 40 characters. The first 9 characters are the order number, followed by a space, followed by a 10 character telephone number, followed by another space, followed by a 4 character error vector (only used for SONAR Level 2 Error Corrections, should be " " in other case). The remaining characters are not used. The name of the input pipe is passed in as the argument (input-spec). Typically, the option "-0" should also be used to specify an output named pipe, and the engine will write to this pipe 28 characters after each service order is processed. The message contains an order number of 9 characters, a space, a telephone number of 10 characters, 6 characters unused, a single character return status code, and a newline character. The engine waits indefinitely for more request on the input pipe until receiving a message that starts with "EXIT". A typical call looks like:

soc -m p -r bvms. mbr -0 out.pipe in.pipe soc -m p -r bvms. mbr -H tso07 -P 5026 -9 out.pipe in.pipe "k"—Multiple Orders Mode from a Socket Server This mode is similar to the pipe mode except the engine is running in a server mode, expecting connections from clients and communicate through two way sockets instead of pipes. The argument (input-spec) is used to specify a port number on which the engine is installed as a server.

The server can accept multiple connections and process requests in a serialized way. The same as the pipe mode, the input message must have 40 characters and the output message will have 28 characters, and their formats are the same, too. Similarly, a message starting with "EXIT" will quit the server (along with connections to all other clients). In addition, a message starting with "CLOSE" will close the connection to the client that sent the message. A typical call looks like:

soc -m k -r bvms.mbr 5100 soc -m k -r bvms.mbr -H tso07 5026 5100

"S"—Single Order Issuance Mode

The mode is used to create one service order for a given account, and the account number (10 digit TN plus 3 digit customer code) is supplied as the argument (input-spec). For the remote mode, the service order will be issued to the SOP system through SOAM; for the local mode, the service order will be saved in a file, whose name is composed of the service order number with suffix ".so". The order number is obtained from the order number server through the built-in function "new_ordn". A typical call in remote mode looks like:

soc -m S issue.mbr -H tso07 -P 5026 30344455565000

"R"—Multiple Order Issuance Mode

In this mode, the engine is invoked to generate multiple service orders listed in a file, whose name is passed in as the argument (input-spec). See Section s:ordercreate for detail discussion on order generation. A typical call looks like:

soc -m R -r issue.mbr account_spec soc -m R -r issue.br -H tso07 -P 5026 account_spec "i"—Interactive Mode This mode is used to issue commands directly to SOAM and is primarily for development and debugging. Table 5 lists commands supported by the engine in a suitable implementation. Appropriately, the interactive processing mode can only be used in the remote operation mode.

TABLE 5

Interactive Commands of Magic Box Engine

| Command Syntax | SOAM Cmd. | Description |
|---|---|---|
| retrinq (ordn) | IQ | Retrieve a service order for inquiry. The order will be saved in file "(ordn).so". No update is allowed to the service order. |
| retrupd (ordn) | UP | Retrieve a service order for update. The order will be saved in the file "(ordn).so". The service order will be locked so that others cannot modify it. |
| replace (ordn) | RP | Replace a service order retrieved using retrupd and unlock the order. The order will be loaded from file "(ordn).so". |
| unlock (ordn) | UN | Unlock the service order retrieved through retrupd without replacing it with a modified copy. |
| enter (ordn) | EN | Create a new service order. The order will be loaded from file "(ordn).so". |
| cancel (ordn) | CO | Cancel an existing service order, which must have been retrieved through retrupd. |

TABLE 5-continued

Interactive Commands of Magic Box Engine

| Command Syntax | SOAM Cmd. | Description |
|---|---|---|
| pending (anything) (tn) | PS | Checking for pending orders on the account. This command is supported only on SOPAD. |
| shutdown | QT | Shut down the SOAM. |
| close | CL | Close the connection of the current client. |
| process (ordn) | | Apply rules to the service order saved locally. |

The argument (input-spec) should typically be omitted. If it is supplied, it should be a file name containing the commands and the engine executes these commands in batch instead of interactively prompting user for commands.

The Rule Language (Rule Set 20, FIG. 1)

This section describes the rule language in a suitable implementation of the Magic Box in more detail. The presentation will be informal and examples will be used to illustrate the general structure and key features. A Magic Box session uses a rule set, which is stored in a text file. Besides actual rules, a rule set may also contain other components, including version declarations, option declarations, macro definitions, function definitions, and procedure definitions. These components can be mixed in any order except that any usage of functions, procedures, and macros must be after their definitions. A semicolon is the indicator of the end of any component, with the exception of rules, each of which may contain several (top-level) procedures and are all terminated by semicolons.

Primitive Values

Syntactically, there are three kinds of primitive values: strings, integers and Boolean values. A string is an arbitrary character sequence enclosed in a pair of double quotes, such as "4001 Discovery Drive". Integers are digit sequences such as 25. Semantically, integers are treated as character strings as well, so 25 is indeed the same s "25". Boolean values contain only TRUE and FALSE. Similar to integers, they are treated as character strings as well, so TRUE is the same as "TRUE". From semantic point of view, there is only one type of primitive values, namely strings.

Names

Two kinds of names are defined by the rule language: fid references and variables.

Fid References

As mentioned earlier, fields in a service order are called fids. The rule language uses a dot notation to refer to fids as follows:

(order).(section).(fid-name)

(order).(section).(fid-name).(floated)

(order) is one of the "CurrentOrder", which refers to the primary order the engine is currently working on, "AltOrder", which refers to an alternative order that sometimes is needed for processing, or "CSR", which refers to the customer service record corresponding to the current customer account. For error checking modes, "CurrentOrder" is loaded before any rule is executed, and for order issuance modes, it is initialized with no contents other than a header. "CSR" is preloaded (before any rule is applied) in order issuance modes, but in error checking modes, it is loaded only when needed (first time a reference to CSR is executed). "AltOrder" has to be loaded explicitly either by calling the built-in action "load_altso" or copying from "CurrentOrder" using the copy action.

(section) is the name of a section in a service order, such as "ID", "LIST", "BILL", etc. (fid-name) is the name of a main (left hand or USOC) fid in the section, such as "TN", "STCD", "ORDT", etc. Finally, (floated) is the name of a floated fid of the main fid specified by the previous 3 components. The first form above addresses a main fid, while the second form addresses a floated fid. As an example, the following name:

CurrentOrder.ID.TN refers to the fid TN in the ID section of the current order. As an exception, for USOC fids, their (fid-name) part must include their action code as the first character. For example, to address the VFN fid of the service order in FIG. 2, we must use "CurrentOrder.S&E.RVFN". For example:

CurrentOrder.S&E.RVFN.DES refers to the floated fid DES of the USOC VFN in the S&E section.

It is possible to have two fids with the same name, mainly in the S&E section. In this case, the above syntax always addresses the first fid with the name. To address other fids with the same name, we need to use for-loops which will be discussed later. A fid reference can be used as either an l-value (e.g., on the left side of an assignment) or an r-value (e.g., on the right side of an assignment). All fid references are assumed to contain string values.

Variables

Variables are used to store temporary values. Syntactically, they are arbitrary character sequences with the following constraints:

1. Each character must be either an alphabetical letter, a numeric digit, the underscore, or the ampersand.
2. The first character must be an alphabetical letter.

As a convention, lower case letters are used for variable names so that they can easily be recognized (fid references always use upper case letters). Variables do not need to be declared. They come into existence the first time they are assigned a value. Like a fid reference, a user variable can be used as either an l-value or an r-value.

Variables can be used to store string values or fid references. The context tells which type of values a variable is holding. There are five cases where a variable is bound to a fid reference, as the variable "fid" in the following examples:

1. In for loops (introduced later), as in
   for fid in CurrentOrder.S&E
2. When used with new, as in
   new CurrentOrderS&E.IMWW as fid
3. When used with copy, as in
   copy CurrentOrderS&E.IMWW as fid
4. When used with exist, as in
   exist fid like CurrentOrder.S&E. "I(MBB|MBBXA)"
   exist after cfid as tfid There are two cases where variables are bound to string values:

1. Inside regular expressions, as in
   CurrentOrder.ID.TN like "( ... ){npa} ( ... ){nxx}-( ... )"
2. When it is used on the left side of an assignment, and it is not previously bound to a fid reference, as in
   count–count+1
   when var–some_functions( )

In summary, variables following the key words "for", "exist" and "as" take fid references as values. Any other binding results string values. Additionally, for variables bound to a main (non-floated) fid, the following syntax can be used to address a floated fid of the former:

(variable). (floated)

An example is "fid.DES" in the rule of FIG. 5, which addresses the floated fid DES of the main fid that is bound to the variable "fid".

Labels

The label is the very first element of a rule. It is included mainly for identification purposes. A label is an arbitrary number that is separated from the main rule body by a colon (":"), as shown in the following example:

9999:
  if CurrentOrder.ID.TN "303 541-6289"
  then CurrentOrder.ID.CUS=CurrentOrder.ID.CUS+ 100;

The label of this rule is "9999". The body of the rule says that if the fid in the ID section of the service order is "303 541-6289", then add 100 to the customer code fid "CUS".

The numeric value of a label is significant. Labels do not affect how the rules are executed: they are not used by the rule interpreter except for the purpose of logging. For this example, if the condition for a given service order evaluates to true, the rule interpreter would have created an entry in the log file as follows:

(9999) R12345678—CurrentOrder.ID.CUS: 100-->200 where R12345678 is the service order number, and 100 is the customer code before the change, and 200 is the customer code after the change.

Universal Quantifier

The language now contains universal quantifiers, as already shown in the examples above. Basically, for loops are used to execute actions for a set of fids as specified with the universal quantifier. Currently, the following syntax variations are supported in one suitable implementation:

"for var in CurrentOrder": loop through all fids in the current order.

"for var in CurrentOrder.section": loop through all fids in the given section of the current order.

"for var like CurrentOrder.section.fidname": loop through all fids with the given name.

"for var like CurrentOrder.section."regerp"": loop through all fids whose name matches the regular expression in the given section.

"for var floated CurrentOrder.section.fidname": loop through all floated fids attached to the fids with the given name.

In the above, var is a variable which will be bound repeatedly each fid satisfying the specifications. The syntax of regular expression is the same as the one used by the pattern matching condition discussed later in this section.

Caution must be taken when one or more fids are deleted in a for-loop. The basic rule is that the fid currently bound to the for-loop variable should never be deleted (though it is fine to delete any of its floated fids). The while-loop discussed later can be used if deletion of fids bound to a for-loop would be necessary. An exception to the basic rule is when the for-loop is going through all floated fids of a main fid (the last syntax variation shown above), in which case the floated fid currently bound to the for-loop variable can be deleted, but other floated fids of the main fid cannot be.

Conditions

The condition part of a rule is used to define a Boolean predicate, which, when evaluated, results in either a "TRUE" or a "FALSE" value. If a condition evaluates to true, the corresponding action part of the rule is executed; otherwise, the "else"-action part, if it exists, is executed. The rule language supports a set of commonly used Boolean operators and comparison operators. Most of these operators assume simple string values. Their meanings are straight-forward and will be briefly described in this section.

Common Comparison Operators

Six commonly used comparison operators are supported by the rule language. They are the equality operator ("=="), the inequality operator ("!="), the greater-than operator (">"), the greater-than-or-equal-to operator ("<="). All of the operators operate on string values. "==" and "!=" assume string comparison semantics, with the ordering based on the lexicographical order. The other four operators assume that the strings represent integer numbers and adopt numerical comparison semantics.

For example, the equality operator tests if the two string operands have the same string value. For example, the condition:

CurrentOrder.ID.TN=="303 541-6289"

would evaluate to true if and only if the fid TN in the ID section contains the telephone number "303 541-6289".

Date Comparison Operators

Two operators, ">>" and "<<", are supplied to compare dates. They take string values as their operands and assume that the operands are of the form "MM-DD-YYYY", "MM-DD-YY", "MM-DD", representing month, date and year, respectively. For two digit years, "19" will be prepended if the year number is greater than 70 and "20" will be prepended otherwise. In case the year information is not given, the current year is assumed with the following special wrap-around exception:

If the month is 1 or 2 and the current month is 11 or 12, then the next year is assumed.

If the month is 11 or 12 and the current month is 1 or 2, then the previous year is assume.

For example, the condition:

CurrentOrder.ID.DD>>"11-15-97"

would evaluate to "TRUE" if the fid "DD" in the "ID" section contains a date without year that is later than "11-15", say "12-15" or "02-15". Of course, suitable variations may be made to the way a date is represented for compatibility reasons.

Pattern Matching Operator "like"

The "like" operator supports a form of pattern matching that is an extension to the standard regular expression facility of Unix. It assumes a string value as its left operand, and a pattern as its right operator. It matches the string against the pattern and procedures a value of "TRUE" or "FALSE" based on if the match has been successful. A major extension to Unix regular expressions is that we support variable binding. See Unix regular expression manual for explanations. The following summarizes the regular expression syntax:

| | any none special character matches itself |
|---|---|
| . | matches any single character |
| $e_1|e_2$ | matches either $e_1$ or $e_2$ |
| [sequence of characters] | matches any characters in the set |
| [^ sequence of characters] | matches any characters not in the set |
| (e) | same as e |
| (e){var} | same as e, also assign the value to the variable var |
| \n | matches a new line, in our case, a continuation line with type N |
| \c | matches the character c itself, which may not be n but can be any special character |
| e* | matches 9 or more occurrences of e, which is any above expression |
| e+ | same as * except matches 1 or more occurrences of e |
| e? | same as * matches 0 or 1 occurrence of e |

Note that unlike Unix regular expression, it is assumed that the regular expression matches the entire string, not just any substring. In effect, it is implicitly assumed that any regular expression starts with ^ and ends with $, and these two characters hence do not have special meaning with our syntax.

For example, the condition:

CurrentOrder.ID.TN like "303.*"

would evaluate to TRUE if the fid TN in the ID section contains a telephone number with an NPA (area code) of 303. As another example, the condition:

CurrentOrder.S&E.HTG like ".*[,;][^ ].*"

would evaluate to TRUE if and only if the fid HTG contains a comma or semicolon not followed by a blank character.

Existential Quantifier

The exist operator "exist" tests if a given fid satisfying certain conditions exists in a service order. It evaluates to true if the fid exists and false otherwise. For example, the condition:

exist fid like CurrentOrder.S&E.IMWW with fid.TN like "303.*"

would evaluate to true if and only if the service order contains a fid MWW with I action code in the S&E section and the fid contains a floated fid TN whose NPA is 303. The condition part (introduced by the keyword "with") is optional, and when it is omitted, the variable binding part (the variable and the keyword "like") can also be omitted. Hence the following example is a very simple usage of the existential quantifier:

exist CurrentOrder.S&E.IMWW

If more than one condition is needed, all conditions can be conjuncted using the logical conjunctives discussed below and enclosed in parenthesis. The following is an example with complicated nested existence operators:

exist fid like CurrentOrder.S&E."[ITER]. *" with (exist fid.TN and fid.TN==fid.TN and exist fid.HTG)

There are also special existential quantifiers.

exist after fid as next_fid

Here the variable next_fid will be bound to the next fid after the given one, fid. Similarly, in exist before fid as prev_fid the variable prev_fid will be bound to the previous fid before the given one, fid.

To check the existence of a floated fid for a given left handed or USOC fid, the following syntax can be used:

exist (fid).(name)

Here (fid) must be a variable bound to a left handed or USOC fid, and (name) is the name of the floated fid. For more complicated conditions than just name, the following syntax can be used:

exist floated (fid) as (floated) with (condition)

Here (fid) must be a name for a left handed or USOC fid, or a variable bound to such a fid. (floated) is another variable that will be bound to the floated fid satisfying the condition, if it exists.

The existential quantifier can also be used to test whether an environmental variable is defined, as in:

exist $MYVAR

The condition returns "TRUE" if and only if when the environment variable MYVAR is defined. For historical and easy-read reasons, the following syntax is also accepted when the condition part is not present:

CurrentOrder.ID.TN exist

CurrentOrder.ID.TN not exist exist CurrentOrder.S&E.IMWW as fid with fid.TN like "303.*"

Set Membership

The following example illustrates the syntax:

CurrentOrder.HDR.STCD in ("AO", "AS", "MA")

This has the same semantics as:

(CurrentOrder.HDR.STCD=="AO"

or CurrentOrder.HDR.STCD=="AS"

or CurrentOrder.HDR.STCD=="MA")

Currently, suet can only be used with the in operator as shown above.

Logical Conjunctives

The logical conjunctive "and" is used to combine two conditions into a compound condition. The combined condition evaluates to true if and only if the two component condition both evaluate to true. Otherwise, the combined condition evaluates to false. For example, the compound condition:

CurrentOrder.HDR.STCD=="AC" and

CurrentOrder.ID.ORDT=="T"

would evaluate to true if and only if the status code (STCD) of the service order is "AC" and it is a T order (ORDT is "T").

The logical conjunctive "or" is also used to combine two conditions into a compound condition. The combined condition evaluates to true if and only if at least one of the two component condition evaluates to true. Otherwise, the combined condition evaluates to false. For example, the compound condition:

CurrentOrder.HDR.STCD=="AC"

or CurrentOrder.HDR.STCD=="AO"

would evaluate to true if and only if the status code (STCD) of the service order is either "AC" or "AO".

Finally, the logical conjunctive "not" is used to negate the value of a simple condition. For example:

not exist CurrentOrder.S&E.IMWW would evaluate to true if there exists no IMWW fid in the S&E section. The "not" conjunctive has a higher precedence than "and", which in turn has a higher precedence than the "or" conjunctive. For example, CurrentOrder.HDR.STCD=="AC"

or CurrentOrder.HDR.STCD=="AO"

and CurrentOrder.ID.ORDT=="T"

is evaluated in the same way as if the condition were written as:

CurrentOrder.HDR.STCD=="AC"

or (CurrentOrder.HDR.STCD=="AO")

and CurrentOrder.ID.ORDT=="T")

Parentheses can be used to override the default procedure. For instance, we may want to use parentheses to rewrite the example above as follows:

(CurrentOrder.HDR.STCD=="AC"

or CurrentOrder.HDR.STCD=="AO"

)

and CurrentOrder.ID.OrDT=="T"

"not" is a unary prefix operator, meaning it should precede the condition it negates. For historical and easy-read reasons, two special negation operators, "not like" and "not exist", are still provided, as given in the following examples:

CurrentOrder.IDEX.PCS not exist

CurrentOrder.ID.TN not like "303.*"

Semantically, they are equivalent to:

not exist CurrentOrder.IDEX.PCS not CurrentOrder.ID.TN like "303.*"

Variable Assignments and Boolean Functions

Assignments are generally not allowed in the condition part because they may potentially modify the service orders. But it is often convenient to store values returned from functions in temporary variables, which will be referenced in other conditions. To restrict the assignment to such variables only, we use a special syntax, as in:

when (var=(function ((arg1), . . . , (argn))

Such a condition always succeeds. For functions that returns "TRUE" or "FALSE" as values, the following condition:

when (function) ((arg1), . . . , (argn))

succeeds if and only if the function returns "TRUE".

Actions

Actions are used in rules to supply change instructions on service orders. They are imperative statements, executed by the rule interpreter if the condition of a rule is met (that is, evaluates to true). Multiple action statements can be included in a rule, in which case, each action statement is executed sequentially in the order they are given. The connector "and" must be used between actions. The rule language in a suitable implementation supports about half a dozen basic constructs for defining actions in rules. These basic constructs are described in this subsection.

Assignments

The assignments are the simplest, yet the most frequently used construct in the rule languages. The syntax of an assignment is as follows:

(name)=(value)

where (name) can be a fid reference or a variable, and (value) can be any one of the following:

1. a fid reference, such as "AltOrder.LIST.OTN"
2. a variable, can be bound to either a fid reference or a string value
3. a string value, quoted using double quotes, such as "QMBCORQ"
4. a number, which is treated as a string, such as "6", which is the same as "6".
5. a function call (presumably in this case the function will return a string value), such as "concat ("AB," ", "CD")".

In an assignment statement, when the target (i.e., the left hand side) of the assignment is a fid that does not already exist in the service order, that fid is first created, as type "C" (left hand fid).

Concatenations

Simple assignment of a fid reference overwrites the old value with the new value. In some cases, this behavior is undesirable and the old value needs to be preserved. A concatenation construct is provided for this purpose. The syntax for concatenations is similar to that of an assignment, except that the sign "=" is replaced by "|=", and the name usually refers to a fid reference (or a variable bound to a fid reference) since these operations make most sense when applied to fids in service orders. The general form is:

(name)|=(value)

The effect of a concatenation is that the value of (name) is appended with a new value (value), with a space separating the old value from the new value, as in CurrentOrder.IDEX.RTG|="(VM 303-896)"

Note a built-in function, "concat" may be prouded to concatenates three or more values together.

Delete Fids

While creating a new fid is implicit by assigning to a non-existing fid reference, deleting fids requires explicit use of the delete operation. To delete a fid from the service order, use the following generic syntax:

delete (name)

where delete is a reserved word, and (name) is a fid reference or a variable bound to a fid reference. The operation deletes the fid from the service order. Deletion of non-existing fid is equivalent to a no-op.

As an example, to delete the fid DUAL from the IDEX section and ICBU from the s&E section of the current service order, use the following:

delete CurrentOrder.IDEX.DUAL and delete CurrentOrder.S&E.ICEU

A scenario that arises often is the need to delete one or more floated fids for a specific (non-floated) fid. The delete-floated operation was introduced to support this need. The generic syntax of this form of delete is:

delete floated (floated-fids) for (name)

where delete, floated and for are all reserved words, (floated-fids) are fid names for floated fids, and (name is a fid name used to quality the floated fids.

Finally, a variant of the delete-floated operation was introduced to address the need of deleting duplicate floated fids. In this case, all the duplicated fids need to be deleted except the first one, which is to be retained. The syntax for this operation is almost exactly the same as the delete-floated operation, except an additional reserved word (duplicate) is used here:

delete duplicate floated (floated-fids) for (name)

The following is an example where we need to delete duplicate fids:

delete duplicate floated CFN, CFNB, CFND for CurrentOrder.S&E.ERD

The effect of this statement is that all duplicate copies of the floated fids with the name of CFN, CFNB or CFND are deleted except the first occurrence of CFN, CFNB or CFND. Notice that all the fids listed in the statement are considered equivalent, so far as deciding whether or not duplication exists. In other words, a fid CFN following a fid CFNB would be considered a duplicate, and vice versa; a fid CFNB following a fid CFND would also be considered a duplicate, and vice versa, etc.

Create New Fids

We have mentioned before that if we assign a value to a non-existent fid, that fid will be created. There are cases when we need to create a new fid having the same name as an existing fid. The following structures can be used in these cases:

new CurrentOrder.LIST.ILN as fid new CurrentOrder.S&E.IMWW "A" as fid

In the above, "A" is an optional fid type specification. For example, the second form creates a USOC fid (reminded that "A" is the fid type for a USOC fid). When the type specification is ignored, the new fid is created as a left hand fid. The newly created fid is bound to the variable "fid" for future references.

Copy One or More Fids

As mentioned before, floated fids are always affiliated with a non-floated fid. There are times when it is desired to copy a non-floated fid along with all its floated fids. The copy action is provided for this purpose. For example, the action:

copy CurrentOrder.S&E.IMWW as newfid duplicates the USOC IMWW along with all its floated fids. The new fid follows immediately the original fid.

The above syntax can only duplicate a fid in the same section. To copy data from one fid along with its floated fids to another section (may even be in different service order), the syntax looks like:

copy CurrentOrder.S&E.IMWW for AltOrder.S&E.IMWW copy CurrentOrder.BILL.LN for fid In the first example, the target fid will be created automatically if it does not exist. The variable "fid" in the second example must be bound to an existing fid.

It is also possible to copy an entire section or even an entire order with this syntax, s in the following examples:

copy CSR.LIST for AltOrder.LIST copy CurrentOrder for AltOrder

Change an R USOC to a C and T Pair

It is often encountered that it is desired to change an R action USOC to a C and T pair of USOCs. The following example does this:

r2ct fid new as newfid

The action code for the variable "fid" is changed to C, the USOC is duplicated and the copy is bound to the variable "newfid", whose action code is set to T.

Move a FID Around

By default, newly created fids will be placed at the end of a section. In some cases the ordering of the fids is significant. Therefore, primitives are provided to move the fids around. The example:

move fid1 after fid2 will move the fid "fid1" after "fid2". Note both variables must be bound to fids in the same section. The following examples are also valid:

move fid after CurrentOrder.RMKS.ACC move CurrentOrder.RMKS.RMK after CurrentOrder.RMKS.ACC move CurrentOrder.RMKS.ACC after CurrentOrder.RMKS In the last example, the fid is moved to the first location of the section CurrentOrder.RMKS.

Nested Rules

A procedure (a for-if-then-else structure) enclosed in parentheses can be used as an action, effectively allowing nested rules. An example:

```
for fid like CurrentOrder.S&E.".MWW"
    if fid.TN == CurrentOrder.ID.TN
        then
    ( for fid2 like CurrentOrder.S&E.".FVJ"
        if fid2.TN == fid.TN
            then . . .
        )
        and . . .
        and . . . ;
```

Functions

The rule language supports a simplistic way of invoking functions. By convention, all functions return a string valued result.

Function Invocation

The syntax for function call is simply a function name followed by a list of arguments enclosed in parentheses, as follows:

(name)((arguments))

where (name) is the name of a function, and (arguments) is a list of values passed into the function. Individual values in the argument list are separated with a comma, and the argument list can be empty. Function invocation can be used in many places where a value is expected. The following examples use functions in condition parts:

length(CurrentOrder.RMKS.RMK)<30 last_htg(fid, fid.HTG)==TRUE

And the following examples use functions in action parts:

count=count+1
&fid=concat(&fid, " ", "HG")

Built-In Functions

Currently, a small but suitable number of functions are defined by the interpreter. More functions may be added in the future as the need arises. The following is a list of the predefined functions in one suitable implementation.

1. (operand1)+(operand2): Add two string values (should represent numbers) and return the result as a string.
2. (operand1)–(operand2): Subtract the second operand from the first. Both are assumed to have string values representing numbers. The result is returned as a string.
3. concat((str1), (separator), (str2)): This function constructs a new string by concatenating the two argument strings, (str1) and (str2), and separating them with the (separator) argument. In effect, it concatenates all these strings and returns the result.
4. substr((str), (first), (last)): This function extracts a substring from the str argument. The substring is defined by arguments first (the position of the first character) and last (the position of the last character). A first of "^" indicates from the beginning, and a last of "$" indicates till the end, of the argument string.
5. length((str)): This function computes the length of the argument string in terms of the number of bytes. It returns the information as a string.
6. norm_date((due.date)): This function generates a value for fid CD based on the argument (due_date), which is a string of the form MM-DD representing a due date. The result returned is in the form of MM-DD-YY. In other words, the year data, which is either the current year or the next year, is added to the input argument.
7. today( ): Return today's date in the format "MM-DD-YY" for the central and eastern region and in the format "MM-DD-YYYY" in the western region. Region is controlled by the command line option for the Magic Box engine.
8. splitlines((str), (linewidth), (splitpoints)): This procedure is only used to split data in the LIST section into multiple lines of indented data. (str) is typically the original content of a fid in LIST section, (linewidth) specifies the maximum characters a line can contain, and (splitpoints) is a string of characters after which the lines can be split. The function returns the modified string where each line is no longer that the specified line width and lines are broken only after characters in (splitpoints). Note that lines are separated with each other by a new line "\n" character.
9. similar((str1), (str2), (kind)): The function returns "TRUE" if the two strings are similar and "FALSE" otherwise. The argument (kind) describes a choice of criteria for being "similar". currently, it can be "A" or "B". The former simply deletes all blank characters in the two strings and then sees if they are identical. The latter sums up all characters in each string and see if there are less than 3 characters difference in count.
10. norm_addr((addr), (type)): The function tries to conform the address (addr) to a standard format. (type) specifies which type of address it should be. Currently, it can be "A" for street addresses, "L" for additional location information, and "P" for post office specifications (city, state and zip code).
11. bvms_avail((npa), (nxx), (type)): The function is used to check BVMS availability data. The option LOAD_BVMS_TABLE (see later in this section) must be turned on in order to use this function. The type specifies what kind of information is needed. It can be "CFN", "COTYPE", "MSS" or "FWDFEATURE". The function returns the data for the given NPA and NXX.
12. dat2num((date)): The function converts a date string (of the format "MM-DD-YYYY", "MM-DD-YY" or "MM-DD") to a number, which is the number of days since 1-1-1970.
13. num2date((number)): This is the reverse of "date2num". The function converts a number to a date string of the format "MM-DD-YYYY" (in western region) or "MM-DD-YY" (in eastern/central region). The number represents the number of days since 1-1-1970.
14. display ((string)): The function prints the string on the terminal. This is for debugging purpose only.
15. contain((str1), (str2))
16. day_of_week((date)): Given a date, returns day of a week as a number from 0 to 6.
17. last_htg((fid), (group)): Returns "TRUE" if the given USOC fid is the last hunting line of the given group. Note the order of hunting lines is the order of lines appearing in the left handed "HTG". The current implementation seems to use the order of USOC fids appearing in the S&E section. Need to check if this is correct.
18. same_fid((fid1), (fid2): Both (fid1) and (fid2) must be bound to fids. The function returns "TRUE" if both are bound to the same fid.
19. new_ordn((npa), (ordertype0)): Obtain a new order number through the order number server.
20. fetch_doi((cuscode)): Fetch the date of installation of the account.
21. expand_acct((tn)): Send the expand command to the midpoint server. (tn) is a 10 digit BTN. The function returns whatever the midpoint server returns, or returns a string starting with "ERROR: " if there is any error.
22. check_pending( ): Returns "TRUE" if there exists a pending order for the account.

Function Definitions

Functions can be defined by user. A function definition takes the following form:

```
func (name)((arguments)) = (retvar):
       (action)
     [ and <action> ] . . .
``` where (retvar) is the name of the variable receiving the return value of the function.

The following is an example of function definition:
func get_nxx(fid)=ret:
 (if fid.TN exist
 then ret=substr(fid.TN, "^", "3")
else if CurrentOrder.ID.TN like "( . . . ) ?( . . . ){nxx0]=? ( . . . )"
 then ret=nxx0
 else ret="000");

There are several things that must be noted:

The function body should assign a value to the return variable.

Even though the function body consist of one or more actions, these actions must not modify the service order in any mean.

Special Function Usage In Conditions

Because general assignments should not be allowed in the condition part of a rule due to possible side effects, the return value of a function can not be put into a variable. To remedy this, the rule language appropriately allows a restricted form of assignment to be used in the condition part, with the following syntax:

when (var)=(function) ((arguments))

where (var) is a variable. Note that such a condition always succeeds.

To use functions as conditions that can either succeed or fail, the functions should return either "TRUE" or "FALSE", and the condition should look like:

(function)((arguments))==TRUE

An equivalent but simpler form is when (function)((arguments))

Plug-In Functions

Suitable implementations allow the use of a UNIX command as a function in the rules, through the plug-in mechanism. For instance, the declaration:

fun get_exch(nap, nxx) as plugin;

makes a UNIX command "get_exch" as a function, which passes two arguments to the UNIX command and returns whatever the command's output to the term as the value.

Zero-Arity Functions

For 0-ary functions, there is an optimization: the function is only evaluated once for each service order and the result is recorded. Any further invocation of the function simply returns the recorded result without recomputation. This optimization may potentially cause different semantics—when values of related fids were modified after initial computation.

Procedures

The rule language also provides procedures. Note that functions are used in place where a value is expected, while procedures are used in place where an action is expected.

Procedure Invocation

The syntax for a procedure call is simply a procedure name followed by a list of arguments enclosed in parentheses, as follows:

(name) ((arguments))

where (name) is the name of the procedure, and (arguments) is a list of values passed into the procedure. Individual values in the argument list are separated with a comma, and the argument list can be empty. Procedure invocation can only be used in place of an action, as the procedure log alert shown in the following rule:

600048:
  for fid like CurrentOrder.S&E. "[ITE](AYK|N2W|NWT)"
  if when COND_ORDT_NTC( )
    and when npa=get_npa( )
    and nfid.TN like "( . . . ) {nxx}.*"
    and bvms_avail(npa, nxx, "COTYPE")=="ERIC"
  then log_alert ("USOC % s cannot be used on a Ericsson switch", &fid);

Built-In Procedures

The inventors presently have developed four procedures that are predefined by the system. Of course, others may be substituted therefor or added there to as appropriate.

1. print(<str>): This function simply displays the str argument on stdout. It is mostly useful for debugging purposes.
2. return(<flowctr>): This function alters the normal flow of processing in various ways according to the value of (flowctr). See page 40 for more details.
3. log_line(<msg>): Write a line message to the log. The line is prepended with rule id and order number.
4. log_linev(<msg>): Write a line message to the log. Unlike "log_line", rule ID and order number are not prepended. However, the argument <msg> may be a string containing variable references, enclosed in braces "{ }". For example,
  log_linev("ERROR: Fid {&fid} cannot have value {fid}")
5. log_alert(<fmt>, <arg>): This is a special form of log_line and it writes a line of message containing rule id, order number, the word ALERT, and the message body to the log. The message body is obtained from "fmt", which is a format string as used by the C routine printf( ) and may contain at most one "% s" descriptor, which will be replaced by the argument "arg".
6. note_csr(<responsible>), <type>, <note>): Post a note to the account. <responsible> specifies a responsible party, <type> is the type of the note, and <note> is the note message itself.
7. load_altso (<file>, <format>): Load an alternative service order from the file (file) to "AltOrder". <format> specifies the format of the order.

Procedure Definitions

Procedure definitions are very similar to function definitions, except that the keyword func is replaced by proc and no return variable should be specified. The syntax therefore looks like:

proc (name) ( <arguments>):
    <action>
    [ and <action> ] . . .

The following example is an example of procedure definition:

proc sub401012(fid):
  (if fid.RAX not exist then fid.RAX="BV")
  and (if fid.BI not exist then fid.BI="SEN");

Set Macros and Global Variables

For sets that are used in many places, set macros can be used to abbreviate them. The statement:

CurrentOrder.HDR.STCD in ("AO", "AS", "MA")

can be rewritten as:

STCD_SET=("AO", "AS", "MA");
. . .
CurrentOrder.HDR.STCD in $STCD_SET

The name of a set macro can be any identifier, and references to the set macro must be preceded with a "$". As with sets themselves, set macros can only be used with an in operator. There is also a built-in set macro, "ERRORS", which stores the set of SOPAD error codes associated with the current order. A typical usage of the variable looks like:

if "0033" in $ERRORS
  and . . .
then . . .

Global variables store string values across rules. An example is given below:

USOCsRESLINE= "1FR | 2FR | 4FR | 8FR | LFV | 2LP | 4LP | 8LP |"

"LQ6 | 4ZR | 2MR | 21M | 1MR | LW1 | LW3 | LM8 |"

"RMN | LF5";

. . .
for fid like CurrentOrder.S&E. "[ITER]($USOCsRESLINE)"
if not fid2.RAX exist
then log_alert ("USOC %s needs a line USOC with RAX", &fid);

The definition of a global variable may refer to other global variables that are already defined. For example, we can define:

USOCsLINE="$USOCsRESLINE|$USOCsBUSLINE";

There is a built-in global variable, "STATUS", which stores the processing status of the current service order. Possible values of the variable include NOCHANGE, UPDATED, SKIPPED, CHANGE, and REISSUE. The following is an example taken from a real rule:

if $STATUS=="UPDATED" and CurrentOrder.RMK-S.RMD not exist
then CurrentOrder.RMKS.RMK="CBR REFUSED, MB COR LVL2";

Additionally, global variables can be defined through command line options of the Magic Box engine. Such global variables sometimes are referred as environmental variables or dynamic global variables, because their values are not defined in the rule sets. Global variables can only be used in certain places:

Inside a regular expression;
In the definition of another global variable.
As a value where a string can appear.
* At left hand of an assignment if the variable is defined through the environment. Note that assignment should be limited to dynamic global variables, not to static variables (defined in rule set) or the built-in variable "STATUS".
In the syntax "exist $(var)" to test if the variable is defined.

Access Name, Action Code. and Type of FIDs
Access the Name of a FID (&)

The need for accessing the name of a fid arises, for example, if it is desired to change the name itself. To do this, a delete followed by a crate may be used. However, a more direct and efficient way is to use the following syntax:

$(order).(section).(fid-name)=(value)

which changes the name of the fid on the left side to (value), a valid variable name expressed as a string value, while all the other aspects of the fid are still maintained. This feature can be very useful, for instance, for fid translation purposes. For example, to translate the fid EX to EXCH, the following rule can be used:

if exist CurrentOrder.ID.EX
then
$CurrentOrder.ID.EX="EXCH";

Note that the modifier "&" can also be used in front of a variable bound to a fid reference.

Access the Type of a Fid (#)

The type of a fid is accessed by prefixing a pound sign (#) to a fid name, as the following generic syntax suggests:

(order).(section).(fid-name)=(value)

which sets the type of the fid to (value), a type indicator expressed as a one character string. The interpreter does not check for the validity for the type code and it is the responsibility of the rule developer to ensure its correctness. Like "&", the modifier "#" can also be used in front of a variable bound to a fid reference.

Access the Action Code of a FID (@)

Similarly, the action code of fid is accessed by prefixing an at-sign (@) to a fid name, as follows:

@(order).(section).(fid-name)=(value)

which updates the action code of the fid to (value), an action code expressed as a one character string. Again, the interpreter does not check for the validity for the action code and it is the responsibility of the rule developer to ensure its correctness. Like "&", the modifier "@" can also be used in front of a variable bound to a fid reference.

Access the Last Occurrence of a Fid (last)

A special need that often arise in service order checking is to access the last subsequent due date. The first subsequent due date is the "SD" fid of the extended ID section, and additional due dates are listed as floated fids of this one, with the same name. The need is to obtain the last floated "SD fid if there is one, or to return the left handed fid if there is no floated "SD". The modifier "last" can be used for this purpose, as in the following rule (a real rule for SONAR Level 2 Error Correction):

and ( (exist CurrentOrder.IDEX.SD
and CurrentOrder.IDEX.FDD >>last CurrentOrder.IDEX.SD)
or (not exist CurrentOrder.IDEX.SD
and CurrentOrder.IDEX.FDD >>CurrentOrder.ID.DD))

As we can see, there may be multiple occurrences of the fid SD, and in this case, the comparison with FDD should be based on the last occurrence.

The While Loop

The if-then structure evaluates the condition once and then executes the action at most once. Sometimes it is required to repeatedly perform some actions until the condition is no longer true. For-loops can be used only when the loop is on different fids satisfying the conditions, but not in other cases. The while-loop is provided to assist other loop requirements. The syntax of a while rule, when compared with an if rule, is that the keyword if it is replaced by the keyword while, and, optionally, the keyword "then" is replaced by the keyword "do":

while (condition
do
(actions);

The while-do loop can be used almost in any place where an if-then structure can be used. In the following example, the while loop is used to combine all multiple blanks into single blanks for all fids in S&E sections:

for fid in CurrentOrder.S&E
while fid like "(.*{part1}+(.*) {part2}"
do fid=concat(part1, " ", part2);

In the following example, the while loop is used to delete all occurrences of HTG USOC fids with I action code in the S&E section:

while exist CurrentOrder.S&E.IHTG
do delete CurrentOrder.S&E.IHTG

Note in this particular case for-loops cannot be used because deletion of a fid interferes the pointers to the remaining fids and hence messes up the for-loops.

Breaking the Rule Execution Sequence

Normally, for each service order, the rules in the rule set are applied in their lexical order. However, there are times when breaking the orders becomes necessary. The built-in action "return" can be used to change the control flow in a number of ways. The action takes one argument, (flowctr), which may be of the following values:

(flowctr)="UNLOCK": abort the processing, all modifications to the service order are discarded, and the service order will not be changed. The processing status is set to 'N'.

(flowctr="SKIP": this is the same as "UNLOCK" except the return status is reported as 'S' instead of 'N'.

(flowctr)="DONE": abort the processing, but all modifications already made will be kept and the service order will be updated.

(flowctr)="BREAK": the current rule is aborted immediately (the next action or the next round in a loop is not performed), but execution will continue from the next rule.

(flowctr)="CHANGE": Cancel the original order and issue a new order using (AltOrder). The processing exits at this point and all remaining rules will be skipped.

(flowctr)="REISSUE": Modify and update the original order and issue a new order using (AltOrder). The processing exits at this point and all remaining rules will be skipped.

(flowctr) is a rule number: skip all rules until the one with the given rule number. If such a rule does not exist or precedes the current rule, then all remaining rules are skipped.

Splitting Rules into Several Files

The syntax:

include "(rulefile)";

can be used to include another rule file with the name (rulefile) as if the file is inserted at that point. This allows rules to be split into several files and common rules can be shared by multiple rule sets.

Options

The rule file includes a syntax to specify options. Currently only two options are supported by the Magic Box, and they are:

option IGNORE_ERROR_CODE
option LOAD_BVMS_TABLE;

The first option tells the Magic Box to ignore checkings for SOPAD error codes (for correcting Level 2 errors only), and the second option instructs the Magic Box to load BVMS availability table. Options should be put right after the version statement, before any rules.

Service Order Creation

The Magic Box system was designed initially for check/correcting service order errors only, and has been extended to issue orders mechanically. The need for mechanically issuing service orders arise in various applications, where application systems generate or store information that need to be used to create service orders (e.g. record orders for billing). Manually crating these orders, not only tedious and error prone, but often intractable due to their large number. The Magic Box handles such order creations in the following ways:

A blank service order is assigned to "CurrentOrder" at the beginning of processing each account (for order issuance modes "S" and "R").

The CSR of the account is also loaded before applying rules.

Rules are used to populate the service order by recap information from the CSR and fill in common entries (such as "ID.APPDT").

Account specific parameters are passed in as environment variables either through command line options (primarily used in "S" mode) or fixed column specification files (used in "R" mode, discussed in detail later this section). The rules use values of these environment variables to populate appropriate entries in the service order.

Using the built-in function "new_Ordn" to fetch a new order number through the order number server and assign it to the service order.

A note will be posted to he BOSS/CARS system through the midpoint server.

The following is a sample input file for "R" mode, extracted from Pager Debit Record Order Issuance application.

TN CUS CD EX PAGERTYPES QUANTITIES PAGERTNS
PAGERCHARGETYPES
"2538799041" " " "03/04/1999" "TAC" "#43" "#001" "#0000000000" "#URTN"
"2064337337" " " " " "03/04/1999" "SEA" "#10029" "#001" "#2068101152" "#SHIP"
"2067623760" " " " " "03/04/1999" "SEA" "#10029" "#001" "#2068714471" "#SHIP"
"2534728674" " " " " "03/04/1999" "TAC" "#10029" "#001" "#2534289707" "#SHIP"
"3606479662" " " " " "03/04/1999" "BLM" "#10029" "#001" "#3607142200" "#SHIP"
"5093288065" " " " " "03/04/1999" "SPO" "#10029#10029" "#001#001"
"#5093549449#5093549449" "#SHIP#SHIP"

The rules that generate service orders from this file is shown below.

include "rordercr.mbr";
proc gen_one_pager(p, q, tn, t, csn):
(
    if p=="2" then new CurrentOrder.S&E.ICT5MA "A" as newfid
    else if p in ("42", "43") then new CurrentOrder.S&E.ICT5MB "A" as newfid
    else if p=="40" then new CurrentOrder.S&E.ICT5MP "A" as newfid
    else if p=="1006" then new Currentorder.S&E.ICT5MQ "A" as newfid
    else if p=="39" then new CurrentOrder.S&E.ICT5MR "A" as newfid
    else if p=="46" then new CurrentOrder.S&E.ICT5MW "A" as newfid
    else if p=="131" then new CurrentOrder.S&E.ICT5S3 "A" as newfid
    else if p=="51" then new CurrentOrder.S&E.ICT5S5 "A" as newfid
    else if p in ("127", "10043", "10044")
        then new CurrentOrder.S&E.IPG5 "A" as newfid
    else if p in ("130", "10041", "10042")
        then new CurrentOrder.S&E.IPGFGA "A" as newfid
    else if p=="10013" then new CurrentOrder.S&E.IPGFAA "A" as newfid
    else if p=="10014" then new CurrentOrder.S&E.ISFQ4A "A" as newfid
    else if p=="10015" then new CurrentOrder.S&E.ISFQ4B "A" as newfid
    else if p in ("10016", "10022", "10023", "10036")
        then new CurrentOrder.S&E.IPGFXB "A" as newfid
    else if p in ("10020", "10021", "10033", "10034", "10035", "10037", "10038", "10039", "10040")
        then new CurrentOrder.S&E.IPGFXA "A" as newfid
    else if p=="10019" then new CurrentOrder.S&E.IPGFXC "A" as newfid
    else if p=="10018" then new CurrentOrder.S&E.IPGFXD "A" as newfid
    else if p in ("10029", "10032")
        then new CurrentOrder.S&E.INR9SE "A" as newfid
    else if p=="10030" then new CurrentOrder.S&E.INR9PH "A" as newfid
    else if p=="10031" then new CurrentOrder.S&E.IR5CPP "A" as newfid
    else if p=="10024" then new CurrentOrder.S&E.IREAKZ "A" as newfid
    else if p in ("10026", "10027")
        then new CurrentOrder.S&E.IRUGPO "A" as newfid
    else if p=="10025" then new CurrentOrder.S&E.IRUGDO "A" as newfid

```
      else if p="10028" then new CurrentOrder.S&E.IB "C"
        as newfid and newfid=3
      else/* if p=="NA" then */newfid="NA")
    and (if newfid !="NA"
      then (if q==" " then newfid=1
        else if q like "0+([^0].*){qq}" then newfid=qq
        else newfid=q)
      and (if p in ("10026", "10027") and newfid>200
        then newfid=newfid-200)
      and (if p=="10025" and newfid>25 then newfid=
        newfid-25)
      and (if csn !=" " then add_csn(newfid)))
  and (if t in ("LOST", "PART", "RPLC", "SHIP")
    and not p in ("10029", "10030")
    then log_alert("SHIPPING CHARGE TYPE NOT
      ALLOWED", " ")
      and return("UNLOCK"))
    and (if t in ("LOST", "RPLC")
      and p !="10028"
    then log_alert("INSTALLMENT BILLING NOT
      ALLOWED", " ")
      and return("UNLOCK"))
    and tmp1=concat("MB CHG", " ", t)
    and tmp2=concat(tn, " ", td)
    and (if $REGION=="EASTERN"
      then CurrentOrder.RMKS.IRMK=concat(tmp1, "
        ",tmp2)
      else CurrentOrder.RMKS.RMK=concat(tmp1, "
        ",tmp2))
    and (if t in ("LOST", "RPLC", "URTN", "DMGD")
  then tmp1=concat("CHG", t, "PGR")
  else if t=="PART"
  then tmp1="CHG PGR PART"
  else if t=="SHIP"
  then tmp1="CHG PGR SHIPPING"
  else if t=="CR"
  then tmp1="CREDIT PGR"
  else if t=="CHRG"
  then tmp1="CHG PGR # CHN"
  else if t=="DISP"
  then tmp1="CHG PGR DISPATCH"
  else if t=="OVER"
  then tmp1="CHG FOR OVERCALLS"
  else tmp1="CHG FOR UNKNOWN")
    and bossnote=concat(tmp1, " ", td)
    and note_csr("MAGIC", "PSOR", bossnote);
710001:
  if CSR.ID.STCD in ("DISC", "SNP")
  then log_alert("The CSR status is %s", CSR.ID.STCD)
  else if $CD like "( ... ){mm}[/-]( ... ){dd}[/-]( ... ){yy}"
    and CSR.ID.TN like "( ... ){npa} ?( ...){nxx}-?( ..
      .){ext}
  then
    tmp=concat(mm, "-", dd)
    and cd=concat(tmp, "-", yy)
    and init_from_csr(npa, nxx, ext, cd, "PAGXXXX",
      "KZ 7116")
    and csn=get_csn( )
  and temppt=$PAGERTYPES
  and tempqt=$QUANTITIES
  and temptn=$PAGERTNS
  and tempct=$PAGERCHARGETYPES
  and (while (temppt like "#([^#]*){firstpt}(.*){restpt}"
    and tempqt like "#([^#]*){firstqt}(.*){restqt}"
    and temptn like "#([^#]*){firsttn}(.*){resttn}"
    and tempct like "#([^#]*){firstct}(.*){restct}")
  do gen_one_pager(firstpt,firstqt,firsttn,firstct,csn)
    and temppt=restpt
    and tempqt=restqt
    and temptn=resttn
    and tempct=restct)
  else log_alert("CSR.ID.TN or CD format is wrong", " ");
```

The above rule file includes another rule file,
"rordercr.mbr", which contains common actions of recapping
information from CSR for generating record orders.
The file is shown below.

```
proc add_csn(fid):
  (if $REGION=="CENTRAL" then fid.CSN="00"else
    fid.CSN="*");
func get_csn( )=csn:
  (if exist CSR.BILL.CSN as csnfid
  then csn=csnfid
  else if exist CSR.BILL. ".*" as fid with fid.CSN exist
  then csn=fid.CSN
  else csn=" ");
func get_exch(npa, nxx) as plugin;
/*
* cd must be in the format of mm-dd-yyyy
/*
proc init_from_csr(npa, nxx, ext, cd, sls, zap):
  td=today( )
  and (if cd <<td
    then mmdd=substr(td, 1, 5)
      and (if $REGION=="WESTERN"
        then year=substr(td, 7, 10)
        and CurrentOrder.BILL.EBD=cd
        else if $REGION=="EASTERN"
        then year=substr(td, 7, 8)
        and cdmmdd=substr(cd, 1, 5)
        and cdyy=substr(cd, 9, 10)
        and CurrentOrder.BILL.IEBD=concat(cdmmdd,
          "-", cdyy)
        and CurrentOrder.BILL.IEBD|="D"
        else/* $REGION=="CENTRAL" */
        year=substr(td, 7, 8)
        and cdmmdd=substr(cd, 1, 5)
        and cdyy=substr(cd, 9, 10)
        and CurrentOrder.BILL.EBD=concat(cdmmdd,
          "-", cdyy))
    else mmdd=substr(cd, 1, 5)
      and (if $REGION=="WESTERN"
        then year=substr(cd, 7, 10)
        else year=substr(cd, 9, 10)))
  and (if $REGION=="WESTERN"
    then/* CurrentOrder.HDR.STCD="NT" and */
    nxxext=concat(nxx, "-", ext)
    and CurrentOrder.ID.TN=concat(npa, " ", nxxext)
    else if $REGION=="EASTERN"
    then CurrentOrder.HDR.STCD=" "
    and CurrentOrder.HDR.DTCMD="P"
    and CurrentOrder.ID.TN=concat(npa, nxx, ext)
    else if $REGION=="CENTRAL"
    then/* CurrentOrder.HDR.STCD=" "
    /* and CurrentOrder.HDR.OWNID="B" and */
    nxxext=concat(nxx, "-", ext)
    and CurrentOrder.ID.TN=concat(npa, " ", nxxext)
    )
  and CurrentOrder.ID.CUS=CSR.ID.CUS
```

```
and tmp=get_exch(npa, nxx)
and (if length(tmp)>=3 then CurrentOrder.ID.EXCH=
    tmp)
and CurrentOrder.ID.CS=CSR.ID.CS
and CurrentOrder.ID.ORDT="R"
and CurrentOrder.ID.ORDN=new_ordn(npa, "R")
and CurrentOrder.ID.SLS=sls
and (if $REGION=="WESTERN"
    then CurrentOrder.ID.APPDT=concat(td, " ",
        "14P")
    else if $REGION=="EASTERN"
    then CurrentOrder.ID.APPDT=concat(td, " ", "02
        P")
        and CurrentOrder.ID.DD=concat(mmdd, "-",
            year)
        and CurrentOrder.ID.DD.ACC=" "
        and CurrentOrder.BILL.IZAP=zap
        and CurrentOrder.BILL.INRSC="N"
    else if $REGION=="CENTRAL"
    then CurrentOrder.ID.APPDT=substr(td, 1, 5)
        and CurrentOrder.ID.APPTM="03P"
        and CurrentOrder.ID.DD=mmdd)
and CurrentOrder.ID.CD=concat(mmdd, "-", year)
and (if exist CSR.MISC.PCL then
    CurrentOrder.IDEX.PCL=
CSR.MISC.PCL)
and (if exist CSR.LIST.LN then
    CurrentOrder.LIST.LN=CSR.LIST.LN )
and (if exist CSR.LIST.NP then
    CurrentOrder.LIST.NP=CSR.LIST.NP )
and (if exist CSR.LIST.NLST then
    CurrentOrder.LIST.NLST=CSR.LIST.NLST)
and (if exist CSR.LIST.LA then
    CurrentOrder.LIST.LA=CSR.LIST.LA)
and (if exist CSR.LIST.LOC then CurrentOrder.
    LIST.LOC=CSR.LIST.LOC)
and (if exist CSR.LIST.SA then
    CurrentOrder.LIST.SA=CSR.LIST.SA)
and (if exist CSR.BILL.MCN then
    CurrentOrder.BILL.MCN=CSR.BILL.MCN)
and csn=get_csn( )
and (if $REGION !="EASTERN" and csn !=" "
    then CurrentOrder.BILL.CSN=csn);
```

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for correcting a text service order from a customer, the service order having a plurality of text fields, the method comprising:

converting the service order into a linked data structure representing the plurality of text fields;

applying a plurality of rules to the linked data structure to modify the linked data structure as demanded based on the plurality of rules;

converting the linked data structure into a corrected service order when the linked data structure has been modified based on the plurality of rules; and recording modifications made to the service order in a log.

2. The method of claim 1 wherein applying further comprises:

establishing a rule set including the plurality of rules;

parsing the plurality of rules into an internal form compatible with a rule interpreter; and applying the plurality of rules in the internal form with the rule interpreter to modify the linked data structure as demanded based on the plurality of rules.

3. The method of claim 1 wherein converting the service order further comprises:

fetching the service order from a service order processor; and parsing the service order into the linked data structure.

4. The method of claim 1 wherein converting the linked data structure further comprises:

formatting the linked data structure to form the corrected service order; and updating a service order processor with the corrected service order when the linked data structure has been modified based on the plurality of rules.

5. The method of claim 1 wherein each rule of the plurality of rules comprises:

a label; and a rule body including a condition part and an action part.

6. The method of claim 1 wherein at least one rule of the plurality of rules comprises:

a label; and a rule body including a loop specification part, a condition part, and an action part.

7. The method of claim 1 wherein at least one rule of the plurality of rules comprises:

a label; and a rule body including a condition part, an action part, and an else action part.

8. A method for correcting a text service order from a customer, the service order having a plurality of text fields, the method comprising:

converting the service order into a linked data structure representing the plurality of text fields;

applying a plurality of rules to the linked data structure to modify the linked data structure as demanded based on the plurality of rules;

converting the linked data structure into a corrected service order when the linked data structure has been modified based on the plurality of rules;

receiving a correction request at a control module; and upon receiving the correction request, instructing a service order reader to convert the service order by fetching the service order from a service order processor and parsing the service order into the linked data structure.

9. A method for correcting a text service order from a customer, the service order having a plurality of text fields, the method comprising:

converting the service order into a linked data structure representing the plurality of text fields;

applying a plurality of rules to the linked data structure to modify the linked data structure as demanded based on the plurality of rules; and converting the linked data structure into a corrected service order when the linked data structure has been modified based on the plurality of rules wherein the service order has a plurality of sections with each section having a plurality of fields, and wherein each field has a type selected from the group consisting of: left hand, universal service offering code, and floated.

10. A method for correcting a text service order from a customer, the service order having a plurality of text fields, the method comprising:

converting the service order into a linked data structure representing the plurality of text fields;

applying a plurality of rules to the linked data structure to modify the linked data structure as demanded based on the plurality of rules; and converting the linked data structure into a corrected service order when the linked data structure has been modified based on the plurality of rules wherein the service order has a plurality of sections with each section having a plurality of fields, and wherein the linked data structure is a tree-like data structure having a root representing the service order, having a plurality of first-level children with each first level child representing a section of the plurality of sections, and having a plurality of second-level children with each second-level child representing a field of the plurality of fields.

11. A method for correcting a text service order from a customer, the service order having a plurality of text fields, the method comprising:

converting the service order into a linked data structure representing the plurality of text fields;

applying a plurality of rules to the linked data structure to modify the linked data structure as demanded based on the plurality of rules; and converting the linked data structure into a corrected service order when the linked data structure has been modified based on the plurality of rules wherein the service order is represented as free-flow data lines.

12. A method for correcting a text service order from a customer, the service order having a plurality of text fields, the method comprising:

converting the service order into a linked data structure representing the plurality of text fields;

applying a plurality of rules to the linked data structure to modify the linked data structure as demanded based on the plurality of rules; and converting the linked data structure into a corrected service order when the linked data structure has been modified based on the plurality of rules wherein converting the service order, applying the plurality of rules, and converting the linked data structure are performed at least partially on a UNIX based platform.

13. A system for correcting a text service order from a customer, the service order having a plurality of text fields, the system comprising:

a service order reader configured to convert the service order into a linked data structure representing the plurality of text fields;

a rule interpreter configured to apply a plurality of rules to the linked data structure to modify the linked data structure as demanded based on the plurality of rules;

a service order formatter configured to convert the linked data structure into a corrected service order when the linked data structure has been modified based on the plurality of rules; and a log for recording modifications made to the service order.

14. The system of claim 13 further comprising:

a rule set including the plurality of rules; and a rule parser configured to parse the plurality of rules into an internal form compatible with the rule interpreter, wherein the rule interpreter applies the plurality of rules in the internal form to modify the linked data structure as demanded based on the plurality of rules.

15. The system of claim 13 wherein the service order reader is further configured to fetch the service order from a service order processor, and to parse the service order into the linked data structure.

16. The system of claim 13 wherein the service order formatter is further configured to format the linked data structure to form the corrected service order, and to update a service order processor with the corrected service order when the linked data structure has been modified based on the plurality of rules.

17. The system of claim 13 wherein each rule of the plurality of rules comprises:

a label; and a rule body including a condition part and an action part.

18. The system of claim 13 wherein at least one rule of the plurality of rules comprises:

a label; and a rule body including a loop specification part, a condition part, and an action part.

19. The system of claim 13 wherein at least one rule of the plurality of rules comprises:

a label; and a rule body including a condition part, an action part, and an else action part.

20. The system of claim 13 further comprising:

a service order access module configured to bridge communication between the service order reader and a service order processor, and to bridge communication between the service order formatter and the service order processor.

21. The system of claim 13 wherein the service order reader, the rule interpreter, and the service order formatter are implemented as software in a single executable file.

22. The system of claim 21 wherein the single executable file is programmed to support a plurality of different processing modes that are selectable with command line options.

23. The system of claim 13 wherein the service order reader, the rule interpreter, and the service order formatter are further configured to issue service orders.

24. A system for correcting a text service order from a customer, the service order having a plurality of text fields, the system comprising:

a service order reader configured to convert the service order into a linked data structure representing the plurality of text fields;

a rule interpreter configured to apply a plurality of rules to the linked data structure to modify the linked data structure as demanded based on the plurality of rules;

a service order formatter configured to convert the linked data structure into a corrected service order when the linked data structure has been modified based on the plurality of rules; and a control module for receiving a correction request, the control module being configure to, upon receiving the correction request, instruct the service order reader to convert the service order by fetching the service order from a service order processor and parsing the service order into the linked data structure.

25. A system for correcting a text service order from a customer, the service order having a plurality of text fields, the system comprising:

a service order reader configured to convert the service order into a linked data structure representing the plurality of text fields;

a rule interpreter configured to apply a plurality of rules to the linked data structure to modify the linked data structure as demanded based on the plurality of rules; and a service order formatter configured to convert the linked data structure into a corrected service order when the linked data structure has been modified based on the plurality of rules wherein the service order has a plurality of sections with each section having a plurality of fields, and wherein each field has a type selected from the group consisting of: left hand, universal service offering code, and floated.

26. A system for correcting a text service order from a customer, the service order having a plurality of text fields, the system comprising:

a service order reader configured to convert the service order into a linked data structure representing the plurality of text fields;

a rule interpreter configured to apply a plurality of rules to the linked data structure to modify the linked data structure as demanded based on the plurality of rules; and a service order formatter configured to convert the linked data structure into a corrected service order when the linked data structure has been modified based on the plurality of rules wherein the service order has a plurality of sections with each section having a plurality of fields, and wherein the linked data structure is a tree-like data structure having a root representing the service order, having a plurality of first-level children with each first level child representing a section of the plurality of sections, and having a plurality of second-level children with each second-level child representing a field of the plurality of fields.

27. A system for correcting a text service order from a customer, the service order having a plurality of text fields, the system comprising:

a service order reader configured to convert the service order into a linked data structure representing the plurality of text fields;

a rule interpreter configured to apply a plurality of rules to the linked data structure to modify the linked data structure as demanded based on the plurality of rules; and a service order formatter configured to convert the linked data structure into a corrected service order when the linked data structure has been modified based on the plurality of rules wherein the service order is represented as free-flow data lines.

28. A system for correcting a text service order from a customer, the service order having a plurality of text fields, the system comprising:

a service order reader configured to convert the service order into a linked data structure representing the plurality of text fields;

a rule interpreter configured to apply a plurality of rules to the linked data structure to modify the linked data structure as demanded based on the plurality of rules; and a service order formatter configured to convert the linked data structure into a corrected service order when the linked data structure has been modified based on the plurality of rules wherein the service order reader, the rule interpreter, and the service order formatter are implemented at least partially in software on a UNIX based platform.

* * * * *